United States Patent

Mihailovski

[15] 3,700,678
[45] Oct. 24, 1972

[54] 1-PICOLYL-3-PHENYL UREAS

[72] Inventor: Alexander Mihailovski, Berkeley, Calif.

[73] Assignee: Stauffer Chemical Company, New York, N.Y.

[22] Filed: April 30, 1971

[21] Appl. No.: 139,221

[52] U.S. Cl. ............. 260/295 E, 260/295.5 D, 71/94
[51] Int. Cl. .............................................. C07d 31/40
[58] Field of Search ................... 260/295 E, 295.5 D

[56] References Cited

UNITED STATES PATENTS 3,128,280   4/1964   Rorig ..................... 260/295 E

*Primary Examiner*—Alan L. Rotman
*Attorney*—Daniel C. Block, Edwin H. Baker, Albert J. Adamcik and Harry A. Pacini

[57] ABSTRACT

Compounds of the formula

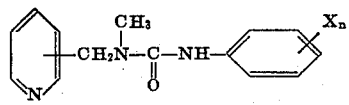

in which X is nitro, methyl or trifluoromethyl, and $n$ is an integer 1 or 2. The utility as post and pre-emergence herbicides of the compounds of the formula

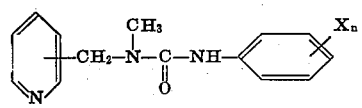

in which X is hydrogen, halogen, nitro, methyl, and trifluoromethyl, and $n$ is an integer 1 or 2.

4 Claims, No Drawings

1-PICOLYL-3-PHENYL UREAS

This invention relates to certain 1-picolyl- 3-phenyl ureas which are new compositions of matter having the formula

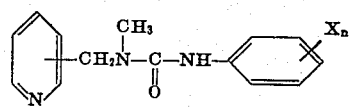

in which X is nitro, methyl or trifluoromethyl, and $n$ is an integer 1 or 2.

Another embodiment of this invention relates to the utility as pre-emergence and post-emergence herbicides of the compounds having the formula

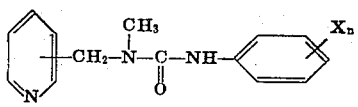

in which X is hydrogen, halogen, nitro, methyl and trifluoromethyl, and $n$ is an integer 1 or 2.

The above-described compounds of this invention have been found to be active herbicides of a general type. That is, certain members of the class have been found to be herbicidally effective against a wide range of plant species. A method of controlling undesirable vegetation of the present invention comprises applying an herbicidally effective amount of the above-described compounds to the area or plant locus where control is desired.

An herbicide is used herein to mean a compound which controls or modifies the growth of plants. By a "growth controlling amount" is meant an amount of compound which causes a modifying effect upon the growth of plants. Such modifying effects include all deviations from natural development, for example, killing, retardation, defoliation, desiccation, regulation, stunting, tillering, stimulation, dwarfing and the like. By "plants" it is meant germinant seeds, emerging seedlings, and established vegetation, including the roots and above-ground portions.

Among the halogen radicals represented by X in the foregoing formula, especially fluorine and chlorine are preferred, however, all the halogens are included with this term, that is, fluorine, chlorine, bromine and iodine. Those skilled in the art will recognize that the degree of substitution depicted by

the foregoing formulas is limited only by the preselected values for $n$ as an integer 1 or 2, steric considerations involved in placement of substituents about a molecule within a finite space. Those skilled in the art will appreciate the availability and possibility of substitution about the pyridine moiety, i.e.,

The closest prior art consists of U.S. Pat. No. 3,128,280 which describes various 1- alkoxylated/halogenated phenyl)- 3- pyridylmethyl ureas and their utility as pharmacological agents. The prior art does not disclose the utility as herbicides.

Preparation of the subject compositions readily proceeds by reacting a picolymethylamine with an appropriate phenyl isocyanate containing the requisite substitutions. The reaction is generally carried out in an inert solvent, e.g., diethyl ether or benzene. This procedure is well known and can be found in the above-cited reference.

The compounds of the present invention and their preparation are more particularly illustrated by the following examples. Following the examples is a table of compounds which are prepared according to the procedures described herein.

EXAMPLE I

Preparation of 1-methyl-1-picolyl-3-phenyl Urea.

To a solution of 5.0 g. (0.041 mole) 2-picolylmethylamine in 30 ml. ethyl ether is added slowly 4.9 g. (0.041 mole) phenyl isocyanate in 30 ml. ethyl ether with cooling in an ice bath. On completing the addition, the ice bath is removed and the reagents are stirred for an additional hour at room temperature. The precipitated solid is filtered, washed with a small amount of ethyl ether and dried. There is obtained 8.5 g. of the title compound, m.p. 138.5°–140° C. Yield is 86 percent of theory. Structural proof is confirmed by infrared and proton magnetic resonance spectroscopy.

EXAMPLE II

Preparation of 1-Methyl-1-picolyl-3-(3', 4'-dichlorophenyl) Urea

In a similar procedure as hereinabove described, the title compound is prepared using 5.0 g. (0.041 mole) 2-picolylmethylamine in 30 ml. diethyl ether with 7.7 g. (0.041 mole) 3,4-dichlorophenyl isocyanate in 30 ml. diethyl ether. There is obtained 8.8 g. of the title compound, m.p. 79°–81.5° C. Yield is 69 percent of theory. Structural proof is confirmed by infrared and proton magnetic resonance spectroscopy.

EXAMPLE III

Preparation of 1-Methyl-1-picolyl-3-(3'-nitrophenyl) Urea

In a similar procedure as hereinabove described, the title compound is prepared using 5.0 g. (0.041 mole) 2-picolylmethylamine in 30 ml. diethyl ether with 5.9 g. (0.036 mole) 3-nitrophenyl isocyanate in 60 ml. diethyl ether. There is obtained 10.1 g. of the title compound, a yellow solid, m.p. 127.5°–129.5° C. Yield is 92.5 percent of theory. Structural proof is confirmed by infrared and proton magnetic resonance spectroscopy.

EXAMPLE IV

Preparation of 1-Methyl-1-picolyl-3-(p-tolyl) Urea

In a similar procedure as hereinabove described, the title compound is prepared using 5.0 g. (0.041 mole) 2-picolylmethylamine in 30 ml. diethyl ether with 5.4 g. (0.041 mole) p-tolyl isocyanate in 30 ml. diethyl ether. There is obtained 8.4 g. of the title compound, m.p. 88°–90 C. Yield is 80.7 percent of theory. Structural proof is confirmed by infrared and proton magnetic resonance spectroscopy.

EXAMPLE V

Preparation of 1-Methyl-1-picolyl-3-(3'-trifluoromethylphenyl) Urea

In a similar procedure as hereinabove described, the title compound is prepared using 3.0 g. (0.025 mole) 2-picolylmethylamine in 20 ml. benzene with 4.6 g. (0.025 mole) 3-trifluoromethylphenyl isocyanate in 30 ml. benzene. There is obtained 5.9 g. of the title compound, m.p. 85°–87° C. Yield is 77.6 percent of theory. Structural proof is confirmed by infrared and proton magnetic resonance spectroscopy.

The is a table of the compounds which are prepared according to the aforementioned procedures. Compound numbers have been assigned to them and are used for identification throughout the balance of the specification.

TABLE I

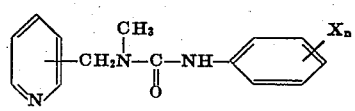

| Compound Number | $X_n$ | Pyridyl Substitution | $n_D^{30}$ or m.p. (°C.) |
|---|---|---|---|
| 1 | H | 2 | 138.5–140 |
| 2 | 4-CH₃ | 2 | 88–90 |
| 3 | 3-Cl | 2 | 102.5–104.5 |
| 4 | 3,4-Cl | 2 | 79–81.5 |
| 5 | 3-NO₂ | 2 | 127.5–129.5 |
| 6 | 3-CF₃ | 2 | 85–87 |
| 7 | 4-Cl,3-CF₃ | 2 | Liquid |
| 8 | 4-Cl | 2 | 117.5–119 |
| 9 | 3-F | 2 | 113–115 |

Other examples of compounds falling within the generic formula presented herein, which are preparable by the aforedescribed procedures and which may be formulated into herbicidal compositions and applied as herein illustrated, include:

| Compound Number | $X_n$ | Pyridyl Substitution |
|---|---|---|
| 10 | 3-F,4-Cl | 3 |
| 11 | 3-NO₂,4-Cl | 2 |
| 12 | 3-NO₂, 4-Cl | 3 |
| 13 | 4-CH₃ | 3 |
| 14 | 3,4-CH₃ | 2 |
| 15 | 3,4-CH₃ | 3 |
| 16 | 3,4-Cl | 4 |
| 17 | 3-F | 4 |
| 18 | 4-CH₃ | 4 |
| 19 | 3-NO₂ | 4 |
| 20 | 3-CF₃ | 4 |

HERBICIDAL SCREENING TESTS

As previously mentioned, the herein described compounds produced in the above-described manner are phytotoxic compounds which are useful and valuable in controlling various plant species. Compounds of this invention are tested as herbicides in the following manner.

Pre-emergence herbicide test

On the day preceding treatment, seeds of seven different weed species are planted in individual rows using one species per row across the width of the flat. The seeds used are hairy crabgrass (*Digitaris sanguinalis* (L.) Scop.), yellow foxtail (*Setaria glauca* (L.) Beauv.), watergrass (*Echinochloa crusgalli* (L.) Beauv.), California red oat (*Avena sativa* (L.)), redroot pigweed (*Amaranthus retroflexus* (L.)), Indian mustard (*Brassica juncea* (L.) Coss.) and curly dock (*Rumex crispus* (L.)). Ample seeds are planted to give about 20 to 50 seedlings per row, after emergence, depending on the size of the plants. The flats are watered after planting. The spraying solution is prepared by dissolving 50 mg. of the test compound in 3 ml. of a solvent, such as acetone, containing 1 percent Tween 20 (polyoxyethylene sorbitan monolaurate). The following day each flat is sprayed at the rate of 20 pounds of the candidate compound per 80 gallons of solution per acre. An atomizer is used to spray the solution onto the soil surface. The flats are placed in a greenhouse at 80° F. and watered regularly. Two weeks later the degree of weed control is determined by comparing the amount of germination and growth of each weed in the treated flats with weeds in several untreated control flats. The rating system is as follows:

0 = no significant injury (Approximately 0–10 per cent control)

3 = slight injury (Approximately 10–40 per cent control)

6 = moderate injury (Approximately 40–70 per cent control)

9 = severe injury or death (Approximately 70–100 per cent control)

An activity index is used to represent the total activity on all seven weed species. The activity index is the sum of the numbers divided by 3, so that an activity index of 21 represents complete control of all seven weeds. The results of this test are reported in Table II.

Post-emergence herbicide test

Seeds of five weed species, including hairy crabgrass, watergrass, California red oats, Indian mustard, and curly dock and one crop, pinto beans (*Phaseolus vulgaris*), are planted in flats as described above for pre-emergence screening. The flats are placed in the greenhouse at 72°–85° F. and watered daily with a sprinkler. About 10 to 14 days after planting, when the primary leaves of the bean plant are almost fully expanded and the first trifoliate leaves are just starting to form, the plants are sprayed. The spray is prepared by weighing out 50 mg. of the test compound, dissolving it in 5 ml. of acetone containing 1 percent Tween 20 (polyoxyethylene sorbitan monolaurate) and then adding 5 ml. of water. The solution is sprayed on the foliage using an atomizer. The spray concentration is 0.5 percent and the rate would be approximately 20 lb/acre if all of the spray were retained on the plant and the soil, but some spray is lost, so it is estimated that the application rate is approximately 12.5 lb/acre.

Beans are used to detect defoliants and plant growth regulators. The beans are trimmed to two or three plants per flat by cutting off the excess weaker plants several days before treatment. The treated plants are placed back in the greenhouse and care is taken to avoid sprinkling the treated foliage with water for 3 days after treatment. Water is applied to the soil by means of a slow stream from a watering hose taking care not to wet the foliage.

Injury rates are recorded 14 days after treatment. The rating system is the same as described above for the pre-emergence test where (0), (3), (6), and (9) are used for the different rates of injury and control. The injury symptoms are also recorded. The maximum activity index for complete control of all the species in the post-emergence screening test is 18. This index represents the sum of the rating numbers obtained with the six plant species used in the test divided by 3. The herbicide activity index is shown in Table II.

TABLE II

HERBICIDAL ACTIVITY SCREENING RESULTS

| Compound Number | Herbicidal Activity Index** | |
|---|---|---|
| | Pre-emergence (20 lb/A) | Post-emergence (12.5 lb/A) |
| 1 | 17 | 6 |
| 2 | 10 | 7 |
| 3 | 14 | 14 |
| 4 | 17 | 14 |
| 5 | 2 | 8 |
| *6 | 7 | 8 |
| *7 | 6 | 14 |
| *8 | 8 | 9 |
| *9 | 8 | 9 |

*Screened at 8 lb/A
** 21 = 70–100% control of all seven plant species tested pre-emergence.
18 = 70–100% control of all six plant species tested post-emergence.

The compounds of the present invention are used as pre-emergence or post-emergence herbicides and are applied in a variety of ways at various concentrations. In practice, the compounds are formulated with an inert carrier, utilizing methods well-known to those skilled in the art, thereby making them suitable for application as dusts, sprays, or drenches and the like, in the form and manner required. The mixtures can be dispersed in water with the aid of a wetting agent or they can be employed in organic liquid compositions, oil and water, water in oil emulsions, with or without the addition of wetting, dispersing or emulsifying agents. An herbicidally effective amount depends upon the nature of the seeds or plants to be controlled and the rate of application varies from 1 to approximately 50 pounds per acre.

The phytotoxic compositions of this invention employing an herbicidally effective amount of the compound described herein are applied to the plants in the conventional manner. Thus, the dust and liquid compositions can be applied to the plant by the use of power-dusters, boom and hand sprayers and spray-dusters. The compositions can also be applied from airplanes as a dust or a spray because they are effective in very low dosages. In order to modify or control growth of germinating seeds or emerging seedlings, as a typical example, the dust and liquid compositions are applied to the soil according to conventional methods and are distributed in the soil to a depth of at least one-half inch below the soil surface. It is not necessary that the phytotoxic compositions be admixed with the soil particles and these compositions can be applied merely by spraying or sprinkling the surface of the soil. The phytotoxic compositions of this invention can also be applied by addition to irrigation water supplied to the field to be treated. This method of application permits the penetration of the compositions into the soil as the water is absorbed therein. Dust compositions, granular compositions or liquid formulations applied to the surface of the soil can be distributed below the surface of the soil by conventional means such as discing, dragging or mixing operations.

The phytotoxic compositions of this invention can also contain other additaments, for example, fertilizers, pesticides and the like, used as an adjuvant or in combination with any of the above-described adjuvants. Other phytotoxic compounds useful in combination with the above-described compounds include, for example, 2,4-dichlorophenoxyacetic acids, 2,4,5-trichlorophenoxyacetic acid, 2-methyl-4-chlorophenoxyacetic acid and the salts, esters and amides thereof; triazine derivatives, such as 2,4-bis(3-methoxypropylamino-6-methyl-thio-S-triazine; 2chloro-4ethylamino-6-isopropylamino-S-triazine, and 2-ethylamino-4isopropylamino-6-methylmercapto-S-triazine, urea derivatives, such as 3-(3,4dichlorophenyl)-1,1-dimethyl urea and 3-p-chlorophenyl)-1,1-dimethyl urea and acetamides such as N,N-dially- α -chloroacetamide, and the like; benzoic acids such as 3-amina-2,5-dichlorobenzoic; and thiocarbamates, such as S-propyl dipropylthiocarbamate, S-ethyl-dipropylthiocarbamate, S-ethylcyclohexyl-ethyl-thiocarbamate, S-ethyl hexahydro-1H-azepine-1-carbothioate, and the like. Fertilizers useful in combination with the active ingredients include, for example, ammonium nitrate, urea and superphosphate. Other useful additaments include materials in which plant organisms take root and grow, such as compost, manure, humus, sand and the like.

The concentration of a compound of the present invention, constituting an effective amount in the best mode of administration in the utility disclosed, is readily determinable by those skilled in the art.

Various changes and modifications are possible without departing from the spirit and scope of the invention described herein and will be apparent to those skilled in the art to which it pertains. It is accordingly intended that the present invention shall only be limited by the scope of the claims.

What is claimed is:

1. A compound having the formula

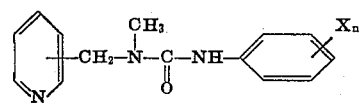

in which X is nitro, methyl or trifluoromethyl, and $n$ is an integer 1 or 2.

2. A compound according to claim 1 in which the pyridyl ring substitution is in the 2-position and $X_n$ is 3nitro.

3. A compound according to claim 1 in which the pyridyl ring substitution is in the 2-position and $X_n$ is trifluoromethyl.

4. A compound according to claim 1 in which the pyridyl ring substitution is in the 2-position and $X_n$ is 4-methyl.

* * * * *